US006195414B1

(12) United States Patent
Simmons et al.

(10) Patent No.: US 6,195,414 B1
(45) Date of Patent: Feb. 27, 2001

(54) DIGITAL FACILITY SIMULATOR WITH CODEC EMULATION

(75) Inventors: Charles W. Simmons, Eatontown; Gary Ellerbusch, Roselle Park; Steven Rumsby, West Allenhurst, all of NJ (US)

(73) Assignee: Telecom Analysis Systems, Eatontown, NJ (US)

( * ) Notice: Subject to any disclaimer, the term of this patent is extended or adjusted under 35 U.S.C. 154(b) by 0 days.

(21) Appl. No.: 09/058,759

(22) Filed: Apr. 11, 1998

Related U.S. Application Data

(60) Provisional application No. 60/043,719, filed on Apr. 17, 1997.

(51) Int. Cl.[7] .................................................. H04M 1/24
(52) U.S. Cl. ............................................. 379/22; 375/225
(58) Field of Search .................................... 379/22, 23, 24, 379/25, 26, 27, 29, 220, 224, 254, 399, 406; 375/224, 225

(56) References Cited

U.S. PATENT DOCUMENTS

| | | | |
|---|---|---|---|
| 4,654,861 | * 3/1987 | Godard | 375/226 |
| 5,005,197 | * 4/1991 | Parsons et al. | 379/21 |
| 5,732,124 | * 3/1998 | Harris et al. | 379/23 |
| 5,754,594 | * 5/1998 | Betts et al. | 375/285 |
| 5,832,058 | * 11/1998 | Walance et al. | 379/22 |
| 5,970,089 | * 10/1999 | Aleylunas et al. | 375/222 |
| 5,982,852 | * 11/1999 | Schwartz | 379/29 |
| 6,023,493 | * 2/2000 | Olafsson | 375/354 |

OTHER PUBLICATIONS

B. Farhang–Boroujeny, "Near optimum timing recovery for digitally implemented data receivers," IEEE Transactions on Communications, vol. 38, No. 9, Sep. 1990, pp. 1333 to 1336.*

"TCS 56K Modem Testing System", pp. 1–2; printout of web pages from "http://www.consultronics.on.ca/tcs56K.htm" accessed and printed from Consultronics web site on Mar. 28, 1998; Consultronics, Ltd., Concord, Ontario, Canada.

"Application Note—56K Modem Testing Solutions", pp. 1–5 printout of web pages from printed from Consultronics web site on Jun. 20, 1997; Consultronics, Ltd., Concord, Ontario, Canada.

"Testing digital modems", Projects PN–3838 and PN–3857, Contribution to TR–30.3 Subcommittee on PCM modems, Telecommunications Industry Association, Mar. 4, 1997.

* cited by examiner

*Primary Examiner*—David R. Hudspeth
*Assistant Examiner*—Martin Lerner
(74) *Attorney, Agent, or Firm*—Michaelson & Wallace; Peter L. Michaelson

(57) ABSTRACT

Apparatus (100) and accompanying methods for accurately simulating a digital facility, including impairments, in a public switched telephone network (PSTN). The invention is particularly suited for precisely emulating, as part of that facility, a line card within a channel bank including a hardware coder-decoder (CODEC) circuit contained therein, but without using an actual CODEC. Specifically, to properly emulate a digital facility, including such a line card, impairments, which need to be emulated, arise not only from the network facility itself but also from the line card. The former include robbed bit signaling (RBS), digital trunk loss and network delay. The latter include intermodulation distortion (IMD), analog loss and echo. To achieve very precise emulation, the simulator implements IMD and network impairments digitally but with the former impairment being processed at much higher, i.e., oversampled, (illustratively 32 kHz) sample rate relative to the sample rate for the latter impairments (e.g., at a standard network sample rate of 8 kHz).

20 Claims, 10 Drawing Sheets

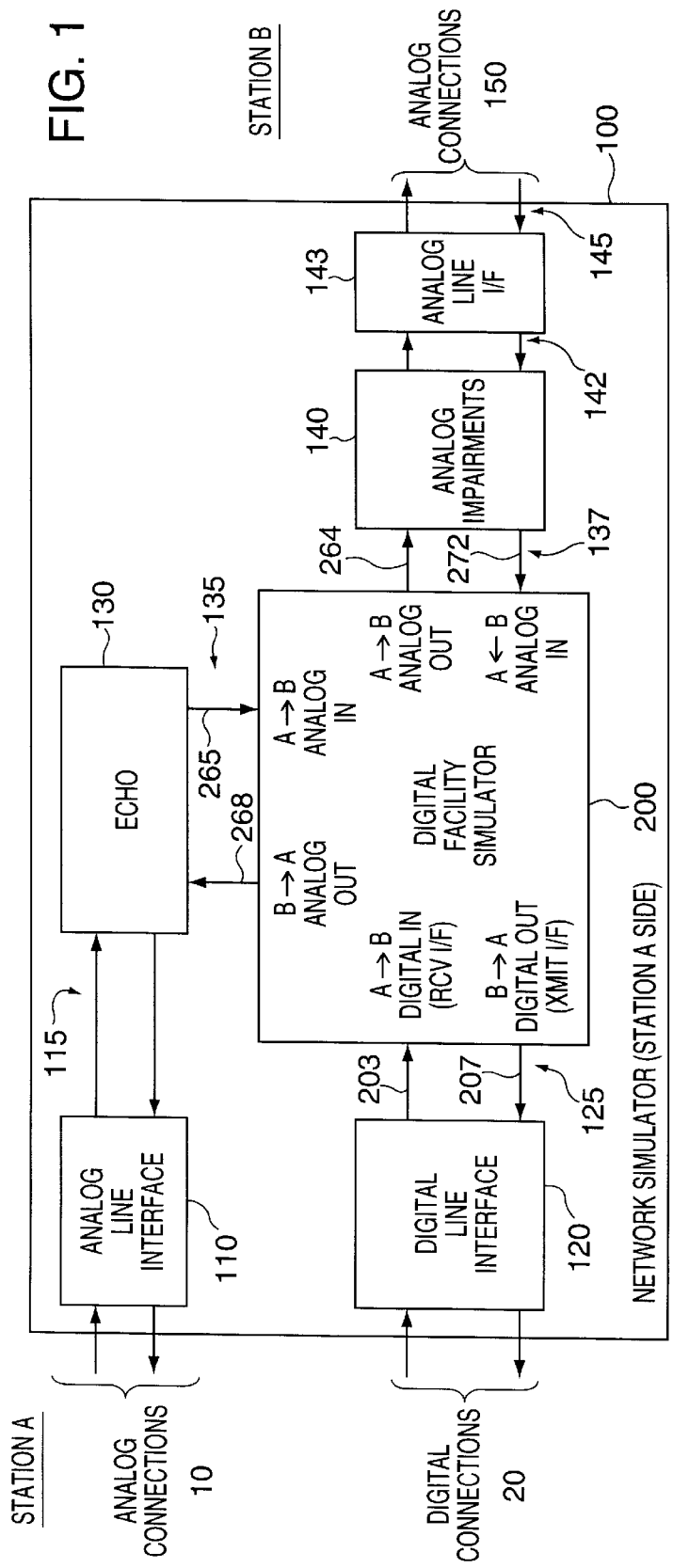

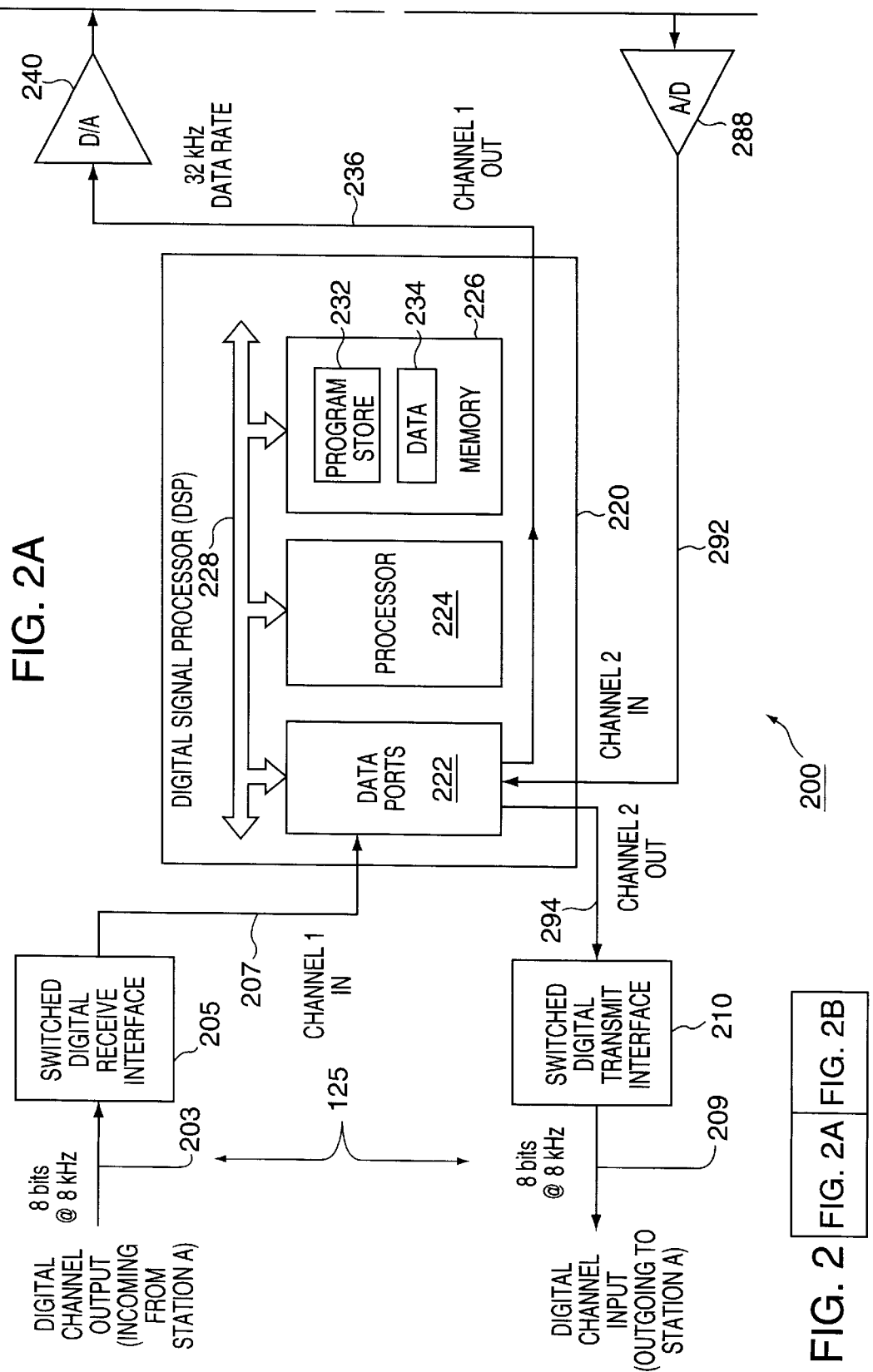

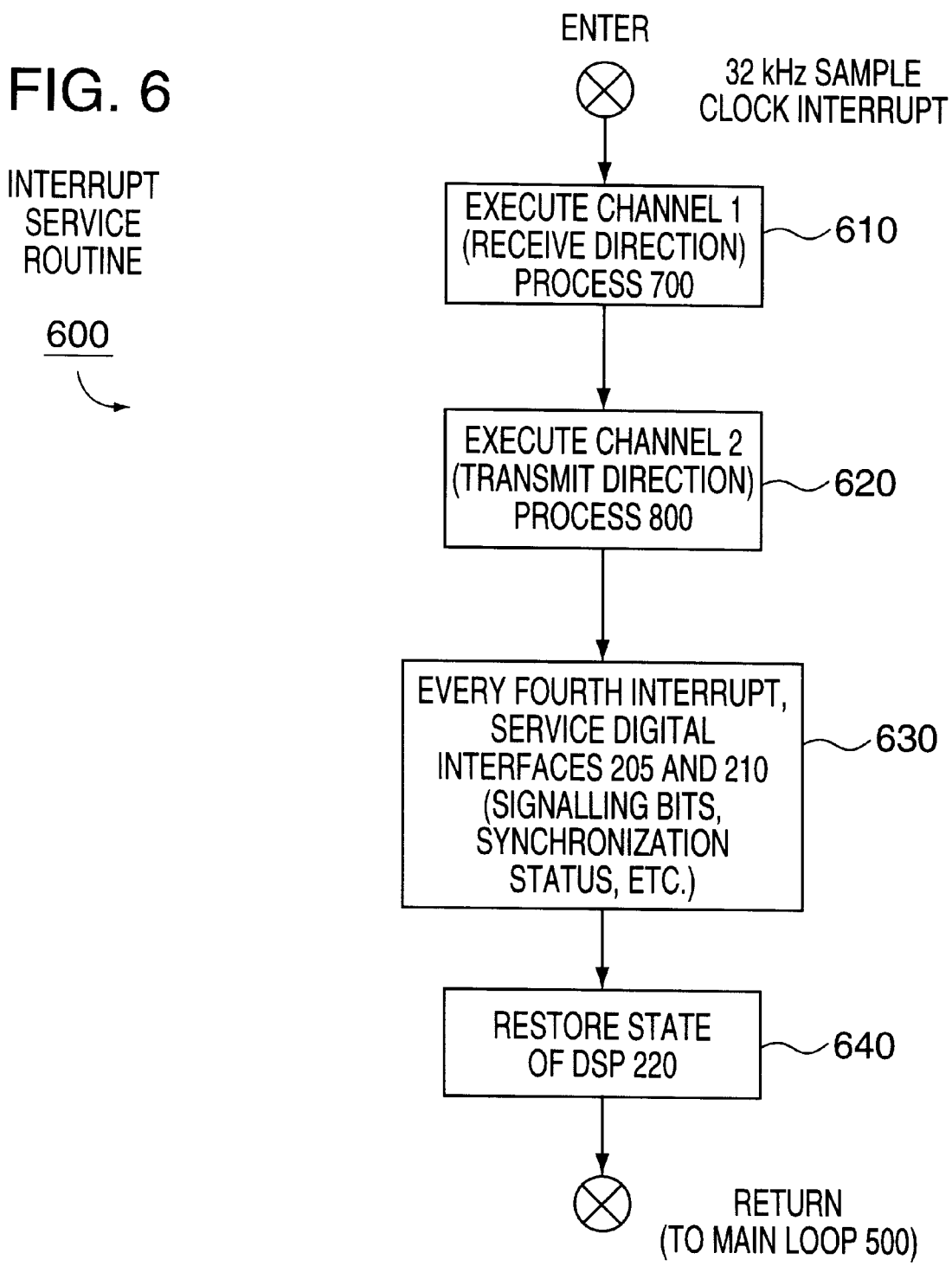

CHANNEL 1
(RECEIVE DIRECTION)
PROCESS

700

CHANNEL 2
(TRANSMIT DIRECTION)
PROCESS

800

DIGITAL FACILITY SIMULATOR WITH CODEC EMULATION

CLAIM TO PRIORITY

We claim priority of our co-pending United States provisional patent application entitled "Digital Facility Emulator" filed Apr. 17, 1997 and accorded Ser. No. 60/043,719, which is also incorporated by reference herein.

BACKGROUND OF THE DISCLOSURE

1. Field of the Invention

The invention relates to apparatus and accompanying methods for accurately simulating a digital facility, including impairments, in a public switched telephone network. The invention is particularly suited for precisely emulating a line card within a channel bank including a hardware coder-decoder (CODEC) circuit contained therein, but without using an actual CODEC.

2. Description of the Prior Art

Over the years and particularly with the recent advent of relatively low-cost widespread Internet access, users are increasingly connecting their computers and other computer-based digital devices through a public switched telephone network (PSTN) to, e.g., remote servers of one form or another.

Though local telephone companies (telcos) are expanding their service offerings and modifying their equipment to permit direct digital access, such as through ISDN (integrated service digital network) service, a predominant and still least costly form of telephone service is so-called "plain old telephone service" (POTS). Through this particular service, a local telco provides, what appears to a subscriber, as an analog connection, i.e., a so-called "POTS line", to which that subscriber can simply attach a telephone. Though POTS lines are designed to principally carry human speech, the low cost of POTS service has led to a vast proliferation of devices, such as facsimile machines and computers, being connected, through, either internal or external, modems to such lines.

Apart from an analog connection at a customer site, the PSTN itself is essentially a digital network. Within the PSTN, channel banks are used to convert analog communication on each subscriber loop, e.g., voice (or data) and signaling, to and from a digital form. Each channel bank connects, though a suitable distribution frame and a copper subscriber line, and on a demand basis, a local subscriber, either a caller or called party, to a central office switch. Within the channel bank, each such party is dynamically assigned to and specifically connected to an available one of a number of line cards. A line card, as part of its functions, synthesizes, from incoming digital information supplied by the switch, appropriate analog telephone signaling waveforms, such as for ringing and dial tone, for application to the subscriber line and also provides analog-to-digital (A/D) and digital-to-analog (D/A) conversion for outgoing and incoming voice (or data) communication appearing on or to be applied to that line, respectively. Given that a POTS line is principally intended to carry speech, a filter on each line card limits the signal carried over the POTS line to approximately 4 kHz of bandwidth.

A line card performs the A/D and D/A conversions in hardware through an internal coder-decoder (CODEC) circuit. Such a CODEC contains suitable analog-to-digital pulse code modulation (PCM) and digital (PCM)- to-analog converters and supporting circuitry, and typically is implemented as a single-chip integrated circuit. Since human speech contains most of its energy within a relatively narrow frequency band ranging from above 300 Hz to below 3 kHz, CODECs intended for use with telephony applications have traditionally been designed to optimally operate within this band so as not to appreciably degrade speech. While this band-limited operation adversely affects voice relatively little, if any, it presents difficulties whenever high speed modem communications, such as in excess of 40 Kbaud/second, are to be carried through a POTS line.

In particular, to achieve such high data rates, modem manufacturers are using wider frequency bands, such as approximately 60 Hz (and lower) to approximately 3.7 kHz, than that for which line card CODECs are typically designed to accommodate. Up until rather recently and particularly the appearance of commercially available modems capable of providing data rates in excess of 40 Kbaud/second, there has not been little, if any, practical reason in the art to characterize CODEC performance outside of its traditional 300 Hz–3 kHz band. However, such a reason now exists.

In order to design modems to properly operate over a wide range of line conditions, modem manufacturers often use network simulation equipment, such as that produced by Telecom Analysis Systems of Eatontown, N. J. (which is also the present assignee hereof), to simulate end-to-end performance of a telephone network, particularly various line impairments presented thereby. Through the use of such equipment, modem manufacturers were able to emulate actual line conditions in a laboratory and/or production environment, and observe ensuing modem response and then modify the design of their modems accordingly. Not surprisingly, such conventional equipment included an actual CODEC, as part of its internal circuitry. Not only do line cards contain CODECs, but also so do modems.

Unfortunately, CODEC performance varies among CODECs produced by different manufacturers, as well as even across different lots of the same CODEC that emanate from a common manufacturer. This variability arises at the high-end of the 4 kHz frequency band, typically first appearing above 3.2 kHz, and results from variations in frequency response characteristics of analog filters, typically switched capacitor reconstruction and anti-aliasing filters, contained in the CODEC in both the receive and transmit directions, respectively, at these frequencies. As a result of this variability, high speed modems, particularly so-called "PCM modems" which attempt to attain data rates of up to 56 Kbaud/second, are often not able to uniformly achieve such speeds from one modem to the next even under ideal test conditions. Given this variability in CODECs—which is understood and conventionally accepted by modem manufacturers, such manufacturers often experience some difficulty in guaranteeing high, particularly maximum, speed performance across all their own PCM modems.

Furthermore, conventional network simulation equipment also uses an actual CODEC. Consequently, individual pieces of the same model of such equipment—or differing pieces of equipment, particularly if those pieces were manufactured several years ago and intended for use with relatively low data rate communication, owing to performance variations from one CODEC to the next, can and often do exhibit some variability from one piece to the next when used to simulate network connections for high data rate communication. This, in turn, can inject some variability into the test results taken over time for a common high data rate modem.

Clearly, one skilled in the art can readily appreciate that simulating a PSTN connection, which is to involve a line card that itself exhibits CODEC-induced variability, when using, over time, different pieces of conventional network simulation equipment that also exhibit CODEC-induced variability, greatly complicates the design of high speed, particularly digital, modems. Hence, to ensure uniformity across their network test equipment, manufacturers of such equipment, particularly of models intended for use with high speed data communications, manually test and carefully select a particular CODEC, which exhibits proper high frequency performance, from among those in an incoming lot(s) for inclusion in each piece of equipment then being manufactured. Needless to say, doing so is rather tedious, time-consuming and expensive.

Moreover, at least one apparatus which has been proposed in the art for testing PCM modems would not only rely on using a network simulator that contains a CODEC but also would rely on incorporating a channel bank, and hence another hardware CODEC therein, directly into a data path of a PCM modem under test. In that regard, see "Testing PCM modems", Projects PN-3838 and PN-3857, *Contribution to TR-30.3 Subcommittee on PCM Modems, Telecommunications Industry Association*, Mar. 4, 1997. Unfortunately, given the inter-CODEC variability, equipment of this sort is rather likely to exhibit undesirable performance variations and hence inconsistencies at high data rates from one installation of this equipment to the next, as well as between this and different network test equipment. This, in turn, would likely inject some error into the test results produced by any of this equipment whenever it is used to test PCM modems.

Clearly, a general need exists in the art for equipment which can accurately simulate actual telephone line conditions through a PSTN that would arise at high data rates, such as would be expected to occur with illustratively PCM modems. Furthermore, a specific need exists to eliminate CODEC-induced variations from such equipment. In that regard, the equipment should accurately emulate the performance of a CODEC throughout an entire frequency range of interest, e.g., approximately 60 Hz (or less) to approximately 4 kHz, needed to support high data rate communication—rather than use an actual CODEC. This equipment should also simulate impairments associated with the connection, including those generated by a line card and a CODEC contained therein. In addition, the equipment should be cost-effective to manufacture. We believe that by using such equipment, modem manufacturers, particularly those of PCM modems, will advantageously be able to more accurately and consistently simulate an actual PSTN connection at high data rates than presently occurs and thus might be able to improve the performance of their high-speed modems.

SUMMARY OF THE INVENTION

Advantageously, our inventive network simulator satisfies these needs and overcomes the deficiencies in the art through a digital facility simulator that relies on emulating an impairment associated with a line card using oversampling, i.e., sampling at a rate in excess of that conventionally used on such a card. By emulating a line card, including the CODEC thereon, in this manner, particularly with an oversampled rate significantly higher than 8 kHz, our inventive simulator is able to very precisely emulate behavior of the line card, including a hardware CODEC thereon, substantially, if not completely, throughout its entire 4 kHz spectral range of interest. Inasmuch as our inventive simulator is not prone to CODEC-induced variabilities, as conventionally occurs with simulators that rely on using an actual hardware CODEC, use of our invention should provide highly consistent results across all network simulators that were to use our invention.

Specifically, in accordance with our present inventive teachings, we have determined that in order to precisely emulate a line card, including a telephony CODEC and its associated filters and hybrid, throughout its entire 4 kHz spectral range, a much higher sampling, e.g., illustratively 32 kHz, rather than 8 kHz, as dictated by common knowledge, should be used for at least one impairment. Through use of such oversampling, our digital facility simulator is advantageously able to provide precise control of an emulated line card out to a 16 kHz range and very precise control over the 4 kHz range of interest, and advantageously provide excellent and consistent results when used to test PCM modems.

In particular, we teach that to properly emulate a digital facility, including a line card containing a hardware CODEC, impairments, which need to be emulated, arise not only from the network facility itself but also from the line card. The former include robbed bit signaling (RBS), digital trunk loss and network delay. The latter two include intermodulation distortion (IMD), loss and echo. To achieve very precise emulation, the IMD, spectral shaping (via interpolation and decimation filters) and network impairments are implemented digitally but with the former impairment being processed at much higher, i.e., oversampled, (illustratively 32 kHz) sample rate relative to the sample rate for the latter impairments (e.g., at a standard network sample rate of 8 kHz).

Our inventive digital facility simulator specifically emulates a network connection, that would be provided through a public switched telephone network (PSTN), between two stations, e.g., a first station being connected to a digital facility, in the PSTN and a second station being analog and connected to a line card within the PSTN.

In this regard, the first station produces, at its network connection, a serial stream of 8-bit PCM samples at an 8 kHz sample rate, as consistent with requirements of the PSTN. Within the digital facility simulator, these samples are first subjected, based on user selection, to RBS and digital trunk loss network facility impairments. Through these impairments up to, e.g., six bits occurring over each series of six successive frames and two sections of predefined digital trunk loss can be injected into the PCM samples. Resulting impaired PCM samples are then converted to linear, e.g., 16-bit, form and subjected to delay, so as to emulate a network delay impairment. The delayed samples are then interpolated (effectively upsampled) to a 32 kHz sample rate. Resulting 32 kHz 16-bit samples are then injected with a user-defined amount of IMD, as one line card impairment. Resulting IMD-impaired samples are then converted to an analog form and further subjected to remaining line card impairments, i.e., analog loss and echo—in user-defined amounts. A resulting impaired analog signal is then routed, as an incoming signal, to an analog network connection of the second telephone station.

An analog telephony signal generated by the second station and destined for the first station is processed in essentially a mirrored fashion, to that stated above. Here, the line card impairments occur first followed by the network impairments. The former includes injecting echo and analog loss impairments in analog form followed by injecting IMD digitally at a oversampled, e.g., 32 kHz, sample rate. For network emulation, the network impairments would then be successively injected, though at 8 kHz sample rate, to simulate network delay, RBS and/or digital trunk loss.

BRIEF DESCRIPTION OF THE DRAWINGS

The teachings of the present invention can be readily understood by considering the following detailed description in conjunction with the accompanying drawings, in which:

FIG. 1 depicts a high-level simplified block diagram of a telephone network simulator that incorporates our inventive digital facility simulator;

FIG. 1A depicts one arrangement through which telephone network simulator 100 can be used to test a PCM modem;

FIG. 2 depicts the correct alignment of the drawing sheets for FIGS. 2A and 2B;

FIGS. 2A and 2B collectively depict a block diagram of inventive digital facility simulator 200 shown in FIG. 1;

FIG. 6 depicts a flowchart of Interrupt Service routine 600 that is executed by DSP 220 shown in FIGS. 2A and 2B;

FIG. 7 depicts the correct alignment of the drawing sheets for FIGS. 7A and 7B;

FIG. 8 depicts the correct alignment of the drawing sheets for FIGS. 8A and 8B.

To facilitate understanding, identical reference numerals have been used, where possible, to designate identical elements that are common to the figures.

DETAILED DESCRIPTION

Figure 2B:
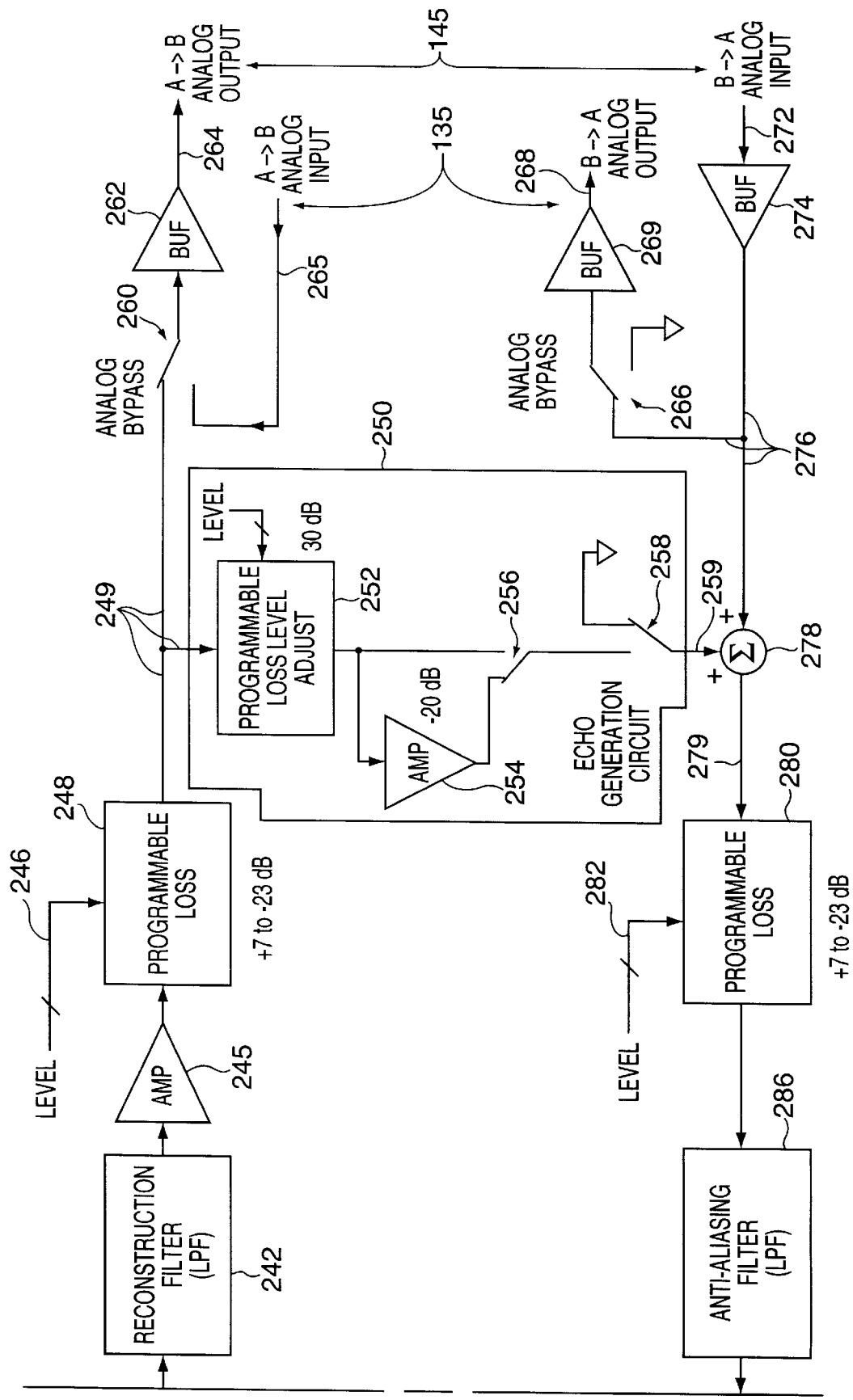

After considering the following description, those skilled in the art will clearly realize that the teachings of our present invention can be utilized in a network simulator for accurately simulating on an end-to-end basis a telephonic connection in a public switched telephone network (PSTN), including emulating a digital facility used within that network. This facility includes not only a digital network link, such as a T1, E1, or other digital link within the network, including its impairments, but also and importantly a line card and a hardware coder-decoder (CODEC) used therein that form part of the facility. Our inventive facility simulator emulates the performance of each such CODEC, including its impairments, but without using an actual CODEC, thereby advantageously eliminating variability typically associated, in practice, with use of actual CODECs.

FIG. 1 depicts a high-level simplified block diagram of a telephone network simulator 100 that incorporates inventive digital facility simulator 200.

Simulator 100 can accurately simulate both analog and digital telephone connections, including impairments to those connections, that would occur through a PSTN between two stations, here illustratively shown as Stations A and B. In use, station A can constitute either an analog or a digital telephonic device, connected through analog connections 10 or digital connections 20, respectively to simulator 100; while station B is an analog telephonic device, connected to the simulator, via connections 150. These telephonic devices (stations) can be any digital or analog equipment, such as, e.g., test equipment or customer premise equipment, the latter typified by a modem, that is designed to function with a digital or analog telephone connection, respectively. Simulator 100 itself includes analog line interfaces 110 and 143, digital line interface 120, echo circuit 130, digital facility simulator 200 and analog impairments circuit 140. Analog line interfaces 110 and 143 are conventional and identical. Accordingly, for the sake of brevity, only interface 110 will be discussed in detail below.

Analog connections 10 and 150 each constitute a two-wire (tip and ring) connection. Digital connections 20 provides a conventional 64 Kbit/second digital serial connection, in each direction, of eight-bit pulse code modulated (PCM) words occurring at an 8 kHz rate and using, in accordance with a user selection, either conventional A-law or $\mu$-law companding.

The PSTN, apart from analog subscriber equipment and central office channel banks, is effectively a digital network. Hence, digital facility simulator 200 can be used to simulate an end-to-end analog-digital connection through the PSTN, such as would arise when using, e.g., a PCM modem connected to an Internet service provider (ISP). FIG. 1A shows arrangement 160, which incorporates simulator 100 for use in illustratively testing a PCM modem. Here, digital transmission source 165—as Station A—produces a desired digital PCM stream in the format and data rate associated with a desired digital line or a desired digital trunk. This stream contains either one or multiple channels (time slots) each having a serial 64 Kbit/second bit PCM data stream in one direction, i.e., incoming or outgoing. These bit streams are connected, via leads 20, to network simulator 100. The simulator, in turn, is connected, via two-wire connections 150 to modem under test 170—as Station B, which is illustratively a PCM modem. A serial (RS-232) output of the modem is connected through leads 175 to personal computer (PC) 180 for data analysis.

Returning to FIG. 1, within simulator 100, the digital PCM bit streams are passed through digital line interface 120, which suitably interfaces to the particular source of the bit streams, i.e., a digital trunk (e.g., T1 or E1). In the case of a digital trunk, interface 120 selects as per user designation, one bi-directional channel provided on the trunk over which bi-directional digital traffic is to be communicated through the simulator to an analog device, e.g., a PCM modem, connected to analog connections 150. In particular, interface 120 routes bits to and from the bi-directional 64 Kbit/second serial channels, via leads 125, to the A→B digital input (receive interface) and B→A output (transmit interface), respectively, in simulator 200.

Digital facility simulator 200 emulates a digital network facility including the degree of impairments to be provided thereby. In practice, a digital network facility can be subjected to robbed bit signaling (RBS), digital trunk loss and delay. RBS arises from the fact that within successive frames of serial digital communication, a least significant bit in a regularly occurring series of frames in each direction, typically once every six frames, is "robbed" by the network, i.e., temporarily used, to carry subscriber and other signaling information, such as on-off hook status, as required by the network rather than end-to-end subscriber data. This, in turn, temporarily decreases the integrity and resolution of endto-end transmitted subscriber data. As more bits are "robbed", the integrity of the transmitted data decreases accordingly. Simulator 200 permits from zero to six bits to be robbed during each series of six successive frames, i.e., up to one least significant bit per transmitted frame. Digital trunk loss results from inclusion of digital pads, into network switches, which are designed to provide a predefined amount of level mapping and hence mimic analog transmission attenuation that would otherwise occur within the network and with which the network has been designed to function. In particular, an 8-bit pulse code modulated (PCM) word is input to a digital pad, typically implemented as an 8-bit look-up table (LUT), with a lower valued 8-bit PCM word being produced as a result. Unfortunately, in practice, different amounts of level shifting are often provided by pads from different network switch manufacturers, even though the pads themselves are intended to provide an identical amount of attenuation. Delay is simply end-to-end network transmission delay, with simulator 200 providing a user programmable amount of delay.

Once the RBS, digital trunk loss and/or network delay impairments, in user-defined amounts, have been injected into the incoming PCM bit stream appearing on lead 203 and emanating from Station A, simulator 200 then injects intermodulation distortion (IMD) as one line card impairment, in digital form; converts a resulting impaired bit stream into analog form to yield a resulting analog signal; filters the resulting analog signal and then applies the remaining line card impairments, specifically loss (i.e., "analog loss")—implemented through a programmable loss element, and echo, in analog form, to yield an impaired analog signal. A resulting outgoing impaired analog signal is then applied, via A→B analog output to outgoing lead 264 within leads 137, analog impairments circuit 140, analog line interface 143 and analog connection 150, to Station B. Analog impairments circuit 140 simulates analog levels, within suitable ranges, of the incoming and outgoing analog signals appearing on two-wire analog connections 150 as well as other analog impairments (all of which are not relevant here) found in a conventional PSTN. Similarly, in a reverse direction, an incoming analog signal generated by Station B is applied, via incoming analog line interface 143, analog impairments circuit 140 and lead 272 within leads 137, to a B→A analog input of simulator 200. Within simulator 200, this incoming analog signal is subjected to user-defined amounts of echo and loss—two of the line card impairments, and finally filtered and converted to digital form to yield a digital signal. The digital signal is then subjected to IMD, as the remaining line card impairment, and then to network impairments: user-defined RBS, digital trunk loss and delay impairments to yield an impaired digital signal which appears on B→A digital output lead 207.

Apart from simulating a digital network facility, simulator 100 also permits a user to bypass simulating such a digital facility in favor of a direct, though impaired, if desired, end-to-end analog connection between Stations A and B. To accomplish this, simulator 200, as will be described below in connection with FIGS. 2A and 2B, contains appropriate internal bypass switches that permit a user to directly inter-connect analog connections 10 for Station A with analog connections 150 for Station B. With these switches set in their proper positions, two-wire analog signals appearing on connections 10 will be connected, via analog line interface 110 and echo circuit 130—which is discussed in detail below, directly through simulator 200 though buffered, and via analog impairments circuit 140, analog line interface 143 and leads 145, to two-wire analog connections 150, totally bypassing any digital facility simulation.

Analog line interface 110, which is conventional and connected to two-wire analog connections 10 (and, as noted above, is identical to analog line interface 143), generates suitable analog supervision, such as ring voltage and other signaling, for an analog device connected to these connections. End-to-end analog communication carried over analog connections 10 is routed, via leads 115, to echo circuit 130, which conventionally simulates near- and far-end echo. To do so, circuit 130 selectively feeds a user-defined portion (including zero, if no analog echo is desired) of the analog signal appearing in each direction on leads 115 and 135 into an opposite direction on these leads. For example, for near-end echo, a portion of the analog signal outgoing from Station A and appearing on leads 115 is added to the incoming signal that is directed to this station and applied to an incoming lead within leads 115 to yield impaired analog signals. For far-end echo, the same occurs but for signals appearing on leads 135 directed outbound from Station B. Resulting two-wire impaired analog signals are routed, via two-wire leads 135, specifically incoming lead 265 and outgoing lead 268, to the digital facility simulator. Within the simulator, the two-wire analog signals are simply buffered by internal analog amplifiers and routed, via leads 137, analog impairments circuit 140, analog line interface 143 and analog connections 150, to and from Station B.

FIGS. 2A and 2B collectively depict a block diagram of inventive digital facility simulator 200, with the correct alignment of the drawing sheets for these figures being shown in FIG. 2.

As shown, simulator 200 is formed of switched digital receive and transmit interfaces 205 and 210; digital signal processor (DSP) 220, digital-to-analog (D/A) and analog-to-digital (A/D) converters 240 and 288; reconstruction and anti-aliasing filters 242 and 286; amplifier 245; programmable loss elements 248 and 280; echo generation circuit 250 itself containing programmable loss level adjust element 252, amplifier 254 and switches 256 and 258; switches 260 and 266; and analog buffers 262, 269 and 274.

Simulator 200 is formed of two channels, one, i.e., Channel 1, for incoming (receive direction) communication from station A to station B (A→B), and the other, i.e., Channel 2, for the opposite (transmit) direction (B→A). The samples for each channel are separately processed by DSP 220 which is illustratively a model TMS 320C50 integrated circuit currently available from Texas Instruments Incorporated of Dallas, Tex. In the receive direction, the DSP imparts user-defined RBS and digital trunk loss impairments to the incoming PCM samples at an 8 kHz sample rate, converts the resulting impaired samples to linear 16-bit parallel form, delays these linear samples to the extent requested by the user, interpolates these samples to a 32 kHz sampling rate, filters the resulting 32 kHz samples to yield filtered samples and finally injects IMD into the filtered samples. This processing order is reversed by the DSP for outgoing linear 16-bit samples that originate from Station B. The specific functional level processing provided by the DSP for each of the channels will be discussed in detail below in conjunction with FIG. 3.

According to the well known Nyquist theorem, in order, at least in theory, to accurately sample a 4 kHz waveform, sampling should occur at an 8 kHz rate, which, in fact, is the sampling rate used in a conventional telephone line card.

However, in accordance with our present invention, we have determined that to achieve very precise emulation, the IMD and network impairments should be implemented digitally but with the former impairment being processed at much higher, i.e., oversampled, (illustratively 32 kHz) sample rate relative to the sample rate for the latter impairments (e.g., at a standard network sample rate of 8 kHz). Given that line cards are designed to function with an 8 kHz sampling rate provided by central office telco equipment, increasing the sampling rate within all or even a portion of such a card would simply add circuit complexities and hence be uneconomic in use—thus likely to be disfavored in the art.

By using such a high sampling rate and hence oversampling for a portion of the line card emulation, our digital facility simulator is advantageously able to provide precise control out to a 16 kHz range and very precise control over the 4 kHz range of interest. We have found that the use of oversampling in our digital facility simulator—rather than totally relying on an 8 kHz sampling rate as would occur in a line card—when emulating line card response provides excellent results particularly when used to test PCM modems.

Returning to FIGS. 2A and 2B, the DSP, as shown and to the extent relevant, contains data ports 222, processor 224 and memory 226 all interconnected through internal bus 228. The memory contains program store 232 and data 234; with the former storing computer executable instructions and associated fixed data, such as that which constitutes Main Loop 500, routine 600 and processes 700 and 800, all of which will be discussed below in conjunction with FIGS. 5–8B.

For Channel 1, 8-bit PCM samples at 8 kHz emanating from Station A and containing data destined for Station B are serially applied, via lead 203, to an input of switched digital receive interface 205. This interface extracts the PCM data and signaling information from each incoming frame appearing on lead 203 and separately applies, under control of the DSP, this data to Channel 1 input lead 207. Lead 207 routes this data and signaling information to a data port of DSP 220. This data is then impaired by the DSP. Resulting impaired 16-bit linear samples produced by the DSP at a 32 kHz sample rate for Channel 1 are applied, via Channel 1 output lead 236, serially to D/A converter 240. This converter converts these samples into an analog signal. The resulting analog signal is applied to reconstruction filter 242 which is a low-pass filter (LPF) implemented as illustratively a sixth-order Butterworth filter. Conventional reconstruction and anti-aliasing filters in a CODEC are implemented as switched capacitor filters which experience variations, from one CODEC to the next, in frequency roll-off below 4 kHz and typically starting at approximately 3.2 kHz. In sharp contrast, we utilize multi-order filters for the reconstruction and anti-aliasing filters that have extremely flat frequency passbands well beyond 4 kHz, thereby assuring highly uniform response within the 4 kHz spectral range of interest. The output of reconstruction filter 242 is amplified through amplifier 245, with a resulting amplified signal then being applied as input to programmable loss element 248. This element, accepts a digital value, on lead 246 and provided by the DSP, which sets an amount of loss to be provided by this element. The loss can be set between +7 (amplification) to −23 dB (attenuation) and encompasses the amplification or loss typically found in a line card. A resulting attenuated analog signal is then applied, via lead 249, to echo generation circuit 250. This circuit injects a user specified portion of the attenuated signal into the analog signal for the outgoing direction and emanating from Station B, thereby emulating an echo condition produced by a four-wire to two-wire hybrid contained in the line card. The signal appearing on leads 249 is also provided to one input of bypass switch 260. The analog output of Station A is applied, via lead 265, to a second input of this switch. The analog signal selected through this switch is buffered by buffer 262 and thereafter applied, via lead 264, as an analog signal to Station B. Switch 260, along with bypass switch 266 for the outgoing analog signal emanating from Station B, when appropriately set, bypasses the remainder of the circuitry in digital facility simulator 200, thereby permitting a direct analog connection between Stations A and B.

Echo generation circuit 250 is formed of programmable loss level adjust element 252 and amplifier 254. Loss element 252, when a digital level value is applied thereto by the DSP, can provide up to 30 dB of user-defined programmed loss. A resulting analog signal produced by element 252 is applied in parallel to an input of amplifier 254, which provides a fixed 20 dB attenuation, and to one input of switch 256. The output of this amplifier is applied to the other input of this switch. By appropriately setting this switch, an output signal, attenuated by 20 dB or not, produced by amplifier 254 can form an echo output signal of circuit 250. The output of switch 256 is applied to one pole of switch 258; the other input being connected to ground. The armature of switch 258 is the output of circuit 250 and is applied to one input of summer 278. By appropriately setting switch 258, either a zero potential will be applied to lead 259 and hence no echo will be generated, or a non-zero potential, i.e., that produced by switch 256, will be applied as the echo output signal from circuit 250.

For channel 2, an analog signal emanating from Station B is first buffered through buffer 274 with a resulting buffered signal being applied, via leads 276. to an armature of switch 266 and another input of summer 278. One pole of this switch is connected to an input of buffer 269; the output of this buffer is connected to the B→A analog output, i.e., lead 268, of digital facility simulator 200. A second pole of switch 266 is connected to ground. Accordingly, with this switch in its bypassed position, the analog signal emanating from Station B is buffered through buffers 274 and 269 and then applied to an analog output, i.e., lead 264, associated with Station A. In the non-bypassed position, the input to buffer 269 is grounded, hence applying a zero potential to an analog input on lead 268 for Station A. As noted above, the echo output signal, produced by echo generation circuit 250 and appearing on lead 259, is applied to one input to summer 278. This summer combines the echo output signal with the buffered analog signal emanating from Station B and appearing on leads 276 thereby injecting echo into the latter signal. A resulting echo-impaired signal produced by the summer, is routed via lead 279, to programmable loss element 280. This element, which is identical to loss element 248, produces under the control of the DSP a programmed loss between +7 (amplification) to −23 dB (attenuation). An analog output signal produced by loss element 280 is applied to anti-aliasing filter 286, which is also implemented as a sixth-order Butterworth low-pass filter. A filtered output produced by filter 286 is applied to A/D converter 288 which produces a stream of 16-bit linear digital samples at a 32 kHz sample rate and applies these samples serially to channel 2 input lead 292. This lead is connected to a data port within data ports 222 of DSP 220. A resulting serial stream of impaired 8-bit PCM samples occurring at 8 kHz is produced by the DSP and applied, from a data port within ports 222 and via channel 2 output lead 294, to switched digital transmit interface 210. This interface, under control of the DSP, constructs appropriate frames containing the impaired PCM samples along with proper signaling and other overhead information. The resulting frames, containing data emanating from Station B, are then applied by interface 210, via lead 209, as outgoing digital frames destined for Station A.

Figure 3:
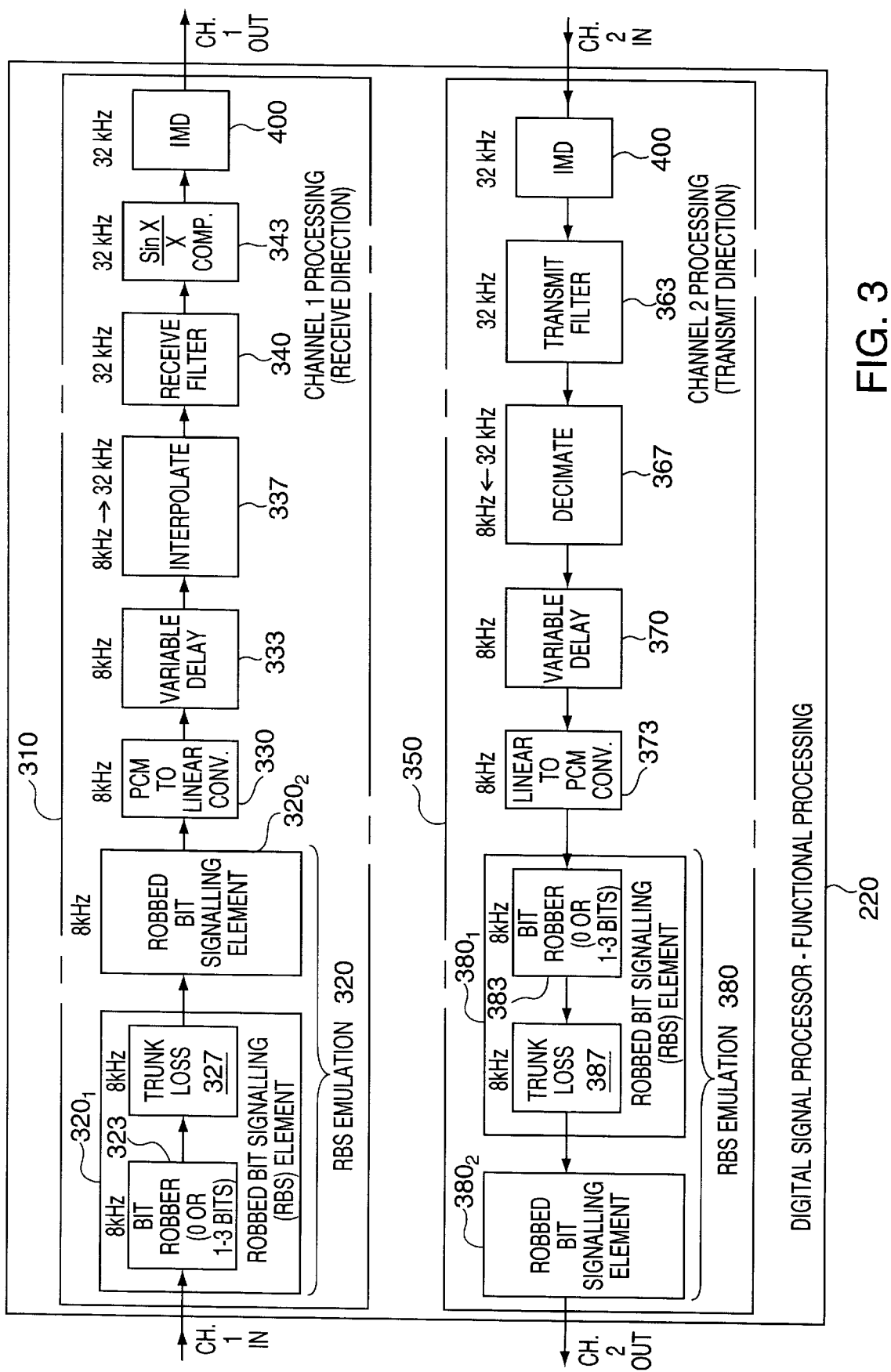
FIG. 3 depicts a functional block diagram of the signal processing provided by digital signal processor (DSP) 220 shown in FIGS. 2A and 2B.

With the above in mind, FIG. 3 depicts a functional block diagram of the signal processing provided by digital signal processor (DSP) 220 for both channels. This processing is divided into Channel 1 processing (receive direction) 310 and Channel 2 processing (transmit direction) 350.

For Channel 1 processing 310, incoming 8-bit serial PCM samples at an 8 kHz sample rate are first applied to RBS emulation 320, which includes identical RBS elements $320_1$, and $320_2$ and operates at a data rate of 64 kbits/second (here an 8 kHz sample rate). Given that these elements are identical, we will only address element $320_1$. This particular element contains bit robber 323 and digital trunk loss section 327. To simulate use of signaling bit(s) used in a digital network facility, bit robber 323 can be set, as determined by the user, to steal a least significant bit in the first, second and/or third frames within each series of six incoming frames of incoming PCM data (to result in one, two or three robbed bits, respectively), or not steal any such bit(s) at all. The resulting PCM frames produced by the bit robber are applied to trunk loss section 327 which injects, if user enabled and as an impairment, a fixed amount of digital trunk loss, also discussed above, through a LUT mapping. The resulting impaired 8 kHz serial PCM samples produced by element $320_1$ are then applied to RBS element $320_2$. Identical to element $320_1$, element $320_2$ impairs its incoming PCM samples, based on user selection, by first stealing, if enabled, an additional one, two and/or three least significant bits in each series of six frames (here being the least significant bit in the fourth, fifth and/or sixth frames, respectively, in each such series) and then injecting, again if user enabled, a fixed amount of digital trunk loss into the resulting samples. The PCM samples ultimately produced by RBS emulation 320 are then applied to PCM to linear converter 330 which, operating at an 8 kHz sample rate, converts each of the 8-bit PCM samples into a linear 16-bit parallel word occurring at an 8 kHz sample rate. The resulting words are then applied, in parallel also at an 8 kHz sample rate, to variable delay 333. This delay, implemented through a circular buffer (in software) imparts a user-defined amount of network delay to each linear sample. Resulting delayed samples produced by delay 333 are applied to interpolator 337 which interpolates these samples to a 32 kHz sample rate by interleaving three identical delayed samples, with equal temporal spacing, between each pair of samples produced by delay 333. A resulting stream of 16-bit samples occurring at a 32 kHz sample rate is applied to digital receive filter 340. This filter, implemented digitally as illustratively an $8^{th}$-order infinite impulse response (IIR) filter with a lattice structure, removes images created during the immediately prior interpolation and also imparts appropriate band shaping required to match a frequency response characteristic of a desired CODEC receive filter. A resulting filtered stream of 32 kHz 16-bit parallel samples produced by filter 340 is applied to compensator 343 which is implemented as a $7^{th}$-order finite impulse response (FIR) filter. The compensator imparts conventional (sin x)/x compensation to each 32 kHz sample in order to counter adverse high frequency emphasis imparted by effectively up-sampling that occurred during interpolation. Resulting compensated 32 kHz samples produced by the compensator are applied to intermodulation distortion element (IMD) 400. This element, which will be discussed in detail below in conjunction with FIG. 4, injects, as a further impairment attributable to a line card, IMD, composed of user-specified amounts of second and third harmonics, into the 32 kHz samples. A resulting level of injected IMD is typically set, by the user, to align with a conventional four-tone IMD test at a level of −12 dB and hence be consistent with most digital terminals. The resulting 32 kHz samples produced by IMD element 400 are applied, by the DSP, in serial form as Channel 1 output samples and routed to D/A converter 240 (see FIGS. 2A and 2B).

As for Channel 2 processing 350, incoming 16-bit serial linear samples occurring at 32 kHz and provided by A/D converter 288 (see FIGS. 2A and 2B), are applied, as shown in FIG. 3, to the DSP through an associated data port. Within the DSP, these serial samples are first applied, in parallel form, to IMD element 400. This element injects, as a further impairment attributable to a line card, IMD, composed of user-specified amounts of second and third harmonics, into the 32 kHz samples. The level is typically set, by the user, to align with a conventional four-tone IMD test at a level of −12 dB and hence be consistent with most digital terminals. The resulting 32 kHz 16-bit samples produced by IMD element 400 are applied to digital transmit filter 363. This filter, implemented digitally as illustratively an $8^{th}$-order IIR filter with a lattice structure, removes power occurring at a frequency above 4 kHz from the samples in order to avoid aliasing that would otherwise occur during a subsequent decimation process. This filter also imparts appropriate band shaping required to match a frequency response characteristic of a desired CODEC transmit filter. A resulting filtered stream of 32 kHz 16-bit parallel samples produced by filter 363 is applied to decimator 367 which extracts, and applies as output, every fourth sample from the 32 kHz samples in order to produce a down-sampled, i.e., decimated, stream of 16-bit parallel samples at an 8 kHz sample rate. The resulting decimated stream of samples is applied to variable delay 370. This delay, implemented through another circular buffer (also in software) imparts a user-defined amount of network delay to each decimated sample. Resulting delayed parallel 16-bit samples produced by delay 370 are applied to linear-to-PCM converter 373 which, operating at an 8 kHz sample rate, converts each of the 16-bit linear samples into an 8-bit PCM sample occurring at an 8 kHz sample rate (here a 64 kbits/second data rate). The resulting PCM samples are then applied, also at an 8 kHz sample rate, to RBS emulation 380. Emulation 380, containing identical RBS elements $380_1$ and $380_2$, function in an identical manner as does RBS emulation 320 to inject up to six bits of RBS and two sections of digital trunk loss, as signal impairments, into the 8-bit PCM samples. RBS element $380_1$ contains bit robber 383 and digital trunk loss section 387 which are identical to bit robber 323 and digital trunk loss section 327, respectively; hence, the description of the former two elements will be omitted. The resulting impaired PCM samples occurring at an 8 kHz sample rate are serially applied by the DSP, as Channel 2 output samples and routed to switched digital transmit interface 210 (see FIGS. 2A and 2B).

Though we have chosen to increase the sample rate above 8 kHz for a portion of the DSP functional processing to provide very precise line card, and specifically CODEC, emulation completely throughout a 4 kHz spectral range of interest, the use of specifically a 32 kHz sample rate is itself not critical. Any of a wide range of sample rates above 8 kHz can be readily used instead provided appropriate design modifications are made to the various filters used in this processing.

Figure 4:
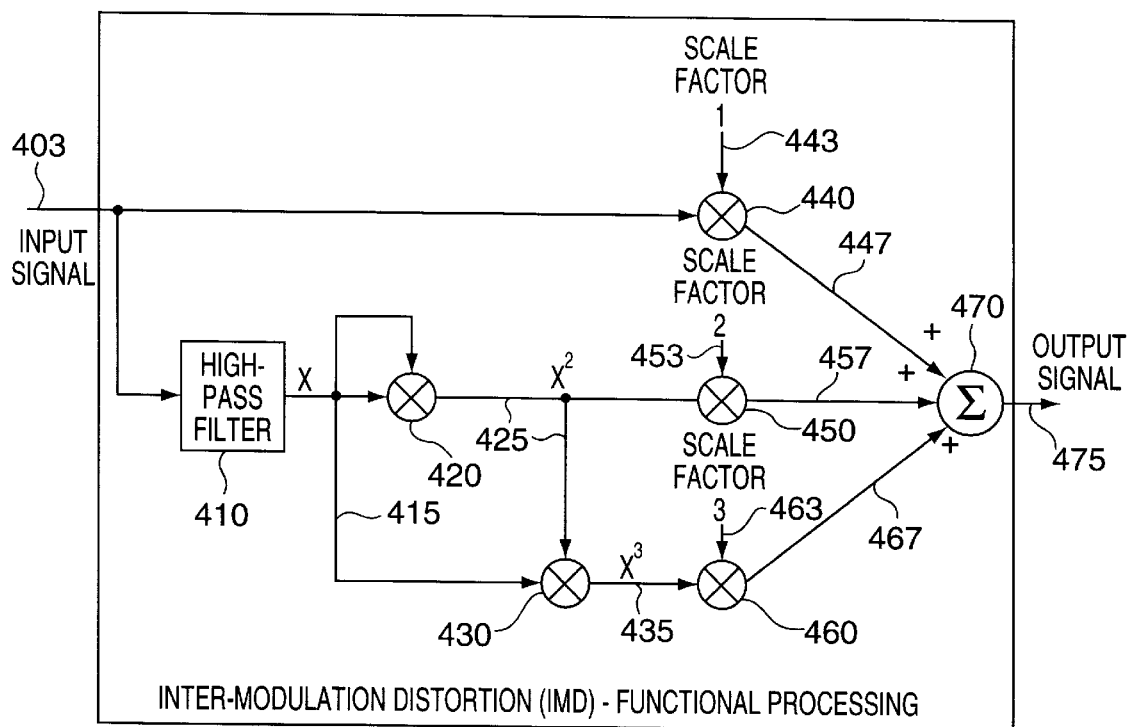
FIG. 4 depicts a functional block diagram of the signal processing provided by intermodulation distortion (IMD) element 400 implemented by DSP 220 shown in FIGS. 2A and 2B.

FIG. 4 depicts a functional block diagram of the signal processing provided by IMD element 400. The actual processing is implemented in software within the DSP.

To create appropriate levels of IMD, input 16-bit samples are provided in parallel to input lead 403. In essence, the value of these samples, as a fundamental value, is squared and cubed to yield second and third harmonic values, respectively, with the fundamental, second and third harmonic values each being separately scaled by a corresponding scale factor to yield three scaled factors that are subsequently summed to yield a digital 16-bit output IMD signal.

In particular, incoming samples applied to lead 403 are routed to multiplier 440 which multiples the value of each such sample by user-defined scale factor 1 which is applied by the DSP to lead 443. A resulting scaled value of the fundamental is applied, via lead 447, as one input to summer 470. The input samples are also applied, via lead 403, to one input of high-pass filter 410. This filter removes any DC component of these values that otherwise would adversely affect, i.e., bias, the values of the second and third harmonics. The output (X) of the high-pass filter is applied to both inputs of multiplier 420 and to one input of multiplier 430. As such, multiplier 420 having the same value applied to both its inputs squares the input (to yield $X^2$), thereby providing the second harmonic value. The second harmonic value is applied to multiplier 450 which multiples the value of each squared value by user-defined scale factor 2 which is applied by the DSP to lead 453. A resulting scaled value of the second harmonic is applied, via lead 457, as another input to summer 470. In addition, the second harmonic value is also applied, via lead 415, to another input of multiplier 430 which calculates the cube ($X^2 \cdot X = X^3$) of the value of each sample, i.e., the third harmonic value. The third harmonic value is applied to multiplier 460 which multiples the value of each cubed value by user-defined scale factor 3 which is applied by the DSP to lead 463. A resulting scaled value of the third harmonic is applied, via lead 467, as another input to summer 470. The resulting combination of the scaled fundamental, and scaled second and third harmonics generated by summer 470 is applied as an IMD-impaired output signal appearing on lead 475. The three scale factors are set by the user such that the level of IMD in the signal on lead 475 aligns with a conventional four-tone IMD test at a level of −12 dB and hence is consistent with most digital terminals.

We will now discuss the software executed by the DSP. To facilitate understanding, the reader should simultaneously refer throughout the ensuing discussion to FIGS. 2A, 2B and 3 along with an appropriate figure, as noted, within FIGS. 5 to 8B.

Figure 5:
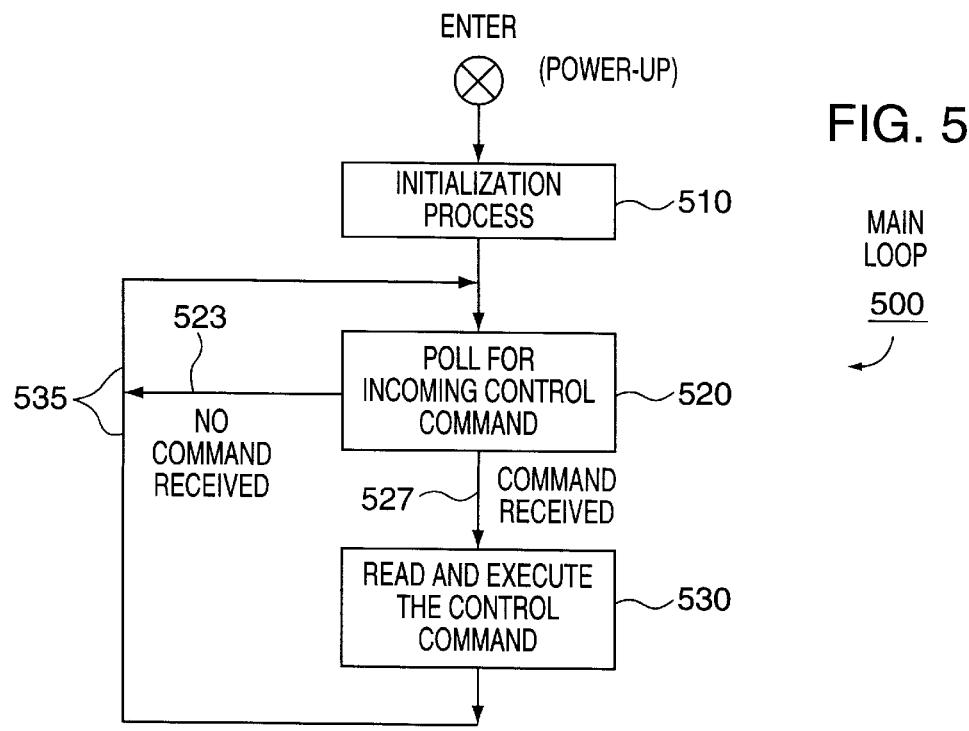
FIG. 5 depicts a flowchart of Main Loop 500 which executes within DSP 220 shown in FIGS. 2A and 2B.

FIG. 5 depicts a flowchart of Main Loop 500 which executes within the DSP. Execution enters loop 500 upon power-up of the network simulator. Once power-up occurs and the DSP begins executing instructions, execution proceeds to initialization process 510 which appropriately initializes the DSP. Once initialization is complete, execution proceeds to block 520 which polls various I/O (input/output) ports (all of which, for simplicity, have not been shown in FIGS. 2A and 2B) on the DSP for an incoming control command. This command can be entered remotely through an appropriate communications link. If such a command is not received, then, as shown in FIG. 5, execution merely loops back, via feedback paths 523 and 535, to block 520 to continue polling. Alternatively, if a control command is received, then block 520 directs execution, via path 527, to block 530 to read and execute the command. Once the command has been fully executed, block 530 directs execution, via path 535, back to block 520 to poll for the next incoming control command, and so forth.

Though not specifically shown in FIG. 5, execution of main loop 500 is interrupted by a 32 kHz sample clock interrupt produced by a timer (not specifically shown). At each occurrence of this interrupt, the DSP executes Interrupt Service routine 600 to essentially perform Channel 1 and Channel 2 processing. Once routine 600 completes its processing, then execution returns to the interrupted point in Main Loop 500.

FIG. 6 depicts a flowchart of Interrupt Service routine 600. Upon entry into routine 600, execution first proceeds to block 610 which executes Channel 1 process 700 (which will be described below in detail in conjunction with FIGS. 7A and 7B) to process 8 kHz PCM samples received from Station A for carriage over the emulated digital facility and destined for Station B. Once this process has been fully executed, execution then proceeds, as shown in FIG. 6, to block 620 to execute Channel 2 process 800 (which will be described below in detail in conjunction with FIGS. 8A and 8B) to process 32 kHz 16-bit linear samples, containing data originating with Station B, carried over the emulated digital facility and destined for Station A. Once Channel 2 process 800 has completed, then, as shown in FIG. 6, execution proceeds to block 630. This block, when executed, services, on every fourth 32 kHz interrupt, digital interfaces 205 and 210 (see FIGS. 2A and 2B) to appropriately: read and/or set the state of signaling bits, obtain synchronization state information or handle other conventional overhead associated with the particular frame based PCM communication used by digital facility being emulated for communication with Station A. Once block 630 has fully executed, execution proceeds, as shown in FIG. 6, to block 640 which restores the state of the DSP that existed immediately prior to the latest 32 kHz sample clock interrupt. Once this occurs, execution exits from routine 600 and returns to Main Loop 500.

Figure 7A:
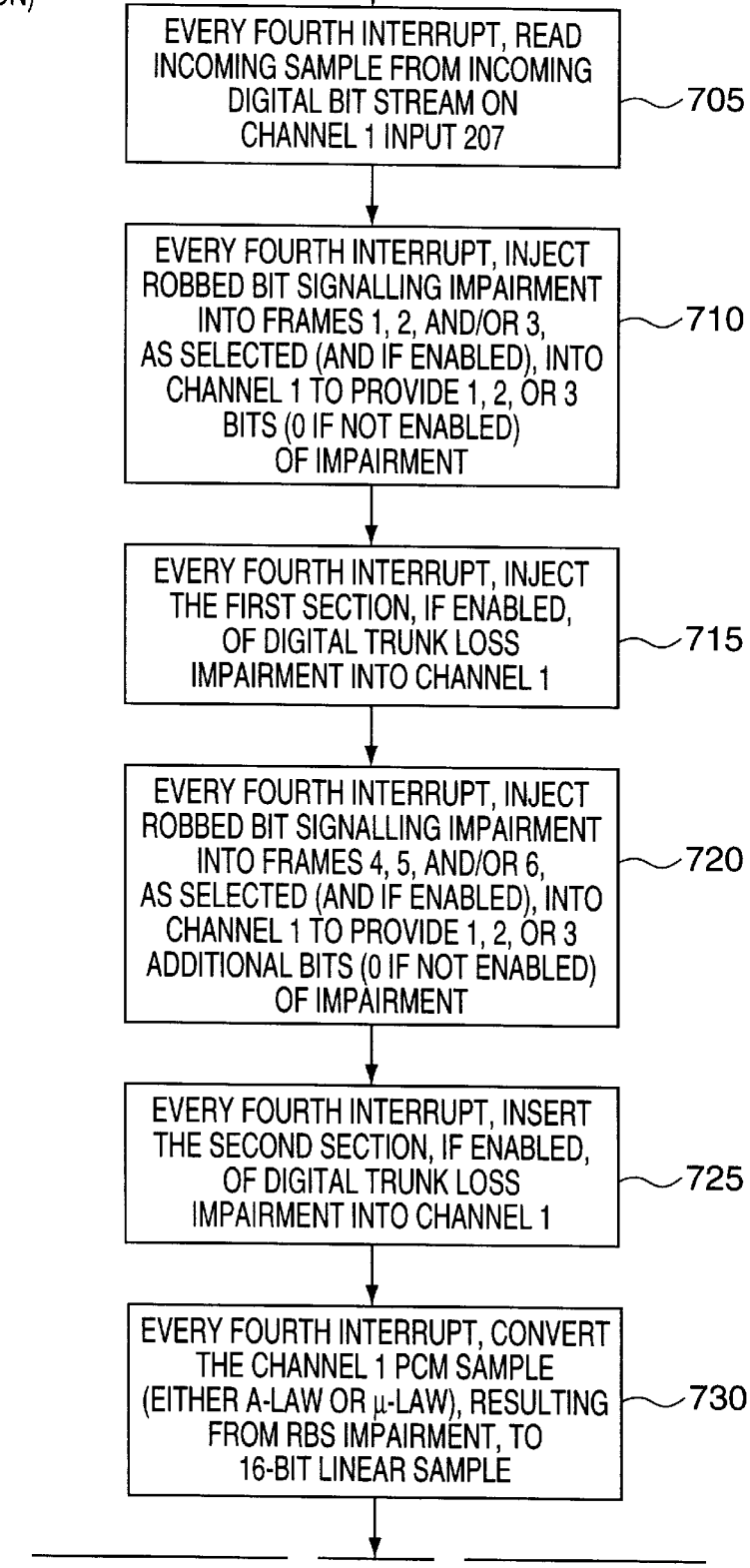
FIGS. 7A and 7B collectively depict a flowchart of Channel 1 (Receive direction) Process 700 that is executed within Interrupt Service routine 600 shown in FIG. 6.
Figure 7B:
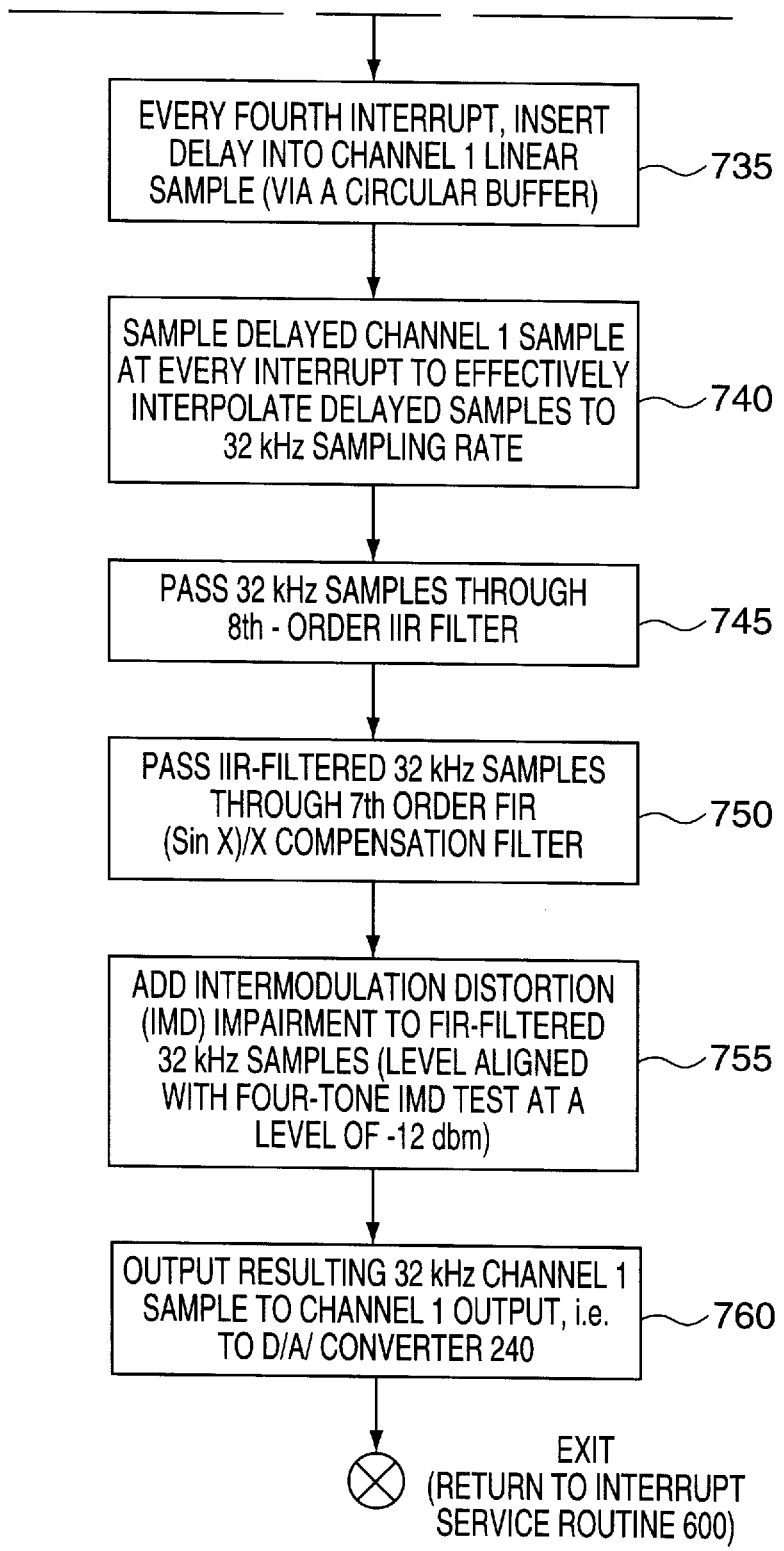

FIGS. 7A and 7B collectively depict a flowchart of Channel 1 (Receive direction) Process 700 that is executed within Interrupt Service routine 600; the correct alignment of the drawing sheets for these figures is shown in FIG. 7.

Upon entry into this process, execution first proceeds to block 705. This block, executed at every fourth 32 kHz sample clock interrupt, reads an incoming PCM sample from the incoming digital bit stream on Channel 1 input 207; thus, implementing an 8 kHz sample rate. Once this occurs, execution proceeds to block 710 which, also at every fourth 32 kHz interrupt for an 8 kHz sample rate, injects an RBS impairment (as discussed above in conjunction with block 323) into the first, second and/or third frames in every six-frame series to provide one, two or three bits of RBS impairment (or no such bits, if this impairment has not been enabled by the user). Once this impairment has been fully injected (or not at all as the case may be), then execution proceeds to block 715. This block, also every fourth 32 kHz interrupt, injects a first section, if enabled by the user, of digital trunk loss impairment (as discussed above in conjunction with block 327) into the 8 kHz PCM sample produced by block 710. Block 720, at every fourth 32 kHz interrupt for an 8 kHz sample rate, injects an RBS impairment (as discussed above in conjunction with block $320_2$) into fourth, fifth and/or sixth frames in every six-frame series to provide an additional one, two or three bits of RBS impairment (or no such bits if this impairment has not been enabled by the user). Thereafter, execution proceeds to block 725 which, also every fourth 32 kHz interrupt, injects a second section, if enabled by the user, of digital trunk loss impairment (as discussed above in conjunction with block $320_2$) into the 8 kHz PCM sample produced by block 720. Once this occurs, block 730 executes to convert every 8 kHz PCM sample, which can be either A-law or $\mu$-law companded as specified by the user, produced by block 725 into a 16-bit linear form also occurring at a 8 kHz sample rate. Once this conversion is complete for a linear sample, execution proceeds to block 735 which, every fourth 32 kHz interrupt, imparts, as discussed above in conjunction with block 333, a user-specified delay, implemented via a circular software buffer), to that sample. A resulting delayed sample is then processed by execution of block 740 which interpolates this sample, as discussed above in conjunction with block 337, to a 32 kHz sample clock. In particular, after every fourth 32 kHz interrupt, i.e., immediately after block 735 produces a new delayed value, block 740 then replicates, at three successive 32 kHz interrupts, this new sample to yield three replicates each occurring at a 32 kHz sample rate. Each delayed 16-bit sample occurring at a 32 kHz sample rate is then digitally filtered by block 745. This block, implementing an $8^{th}$-order IIR receive filter with a lattice structure as discussed above in conjunction with block 340, removes images created during the immediately prior interpolation and also imparts appropriate band shaping required to match a frequency response characteristic of a desired CODEC receive filter. The resulting filtered 32 kHz 16-bit parallel sample produced by block 745 is applied to block 750 which, implementing a $7^{th}$-order finite impulse response (FIR) filter as discussed above in conjunction with block 343, imparts conventional (sin x)/x compensation to each such sample in order to counter adverse high frequency emphasis imparted by effectively up-sampling that occurred during interpolation. A resulting compensated 32 kHz sample produced by the block 750 is applied to block 755 which, as discussed above in conjunction with block 400, injects, user-specified IMD as a further impairment attributable to a line card, into this sample. Thereafter, block 760 executes to provide the resulting impaired 32 kHz sample produced by block 755 in serial form as a Channel 1 output sample for routing to D/A converter 240. Thereafter, execution exits from process 700 and returns to Interrupt Service routine 600.

Figure 8A:
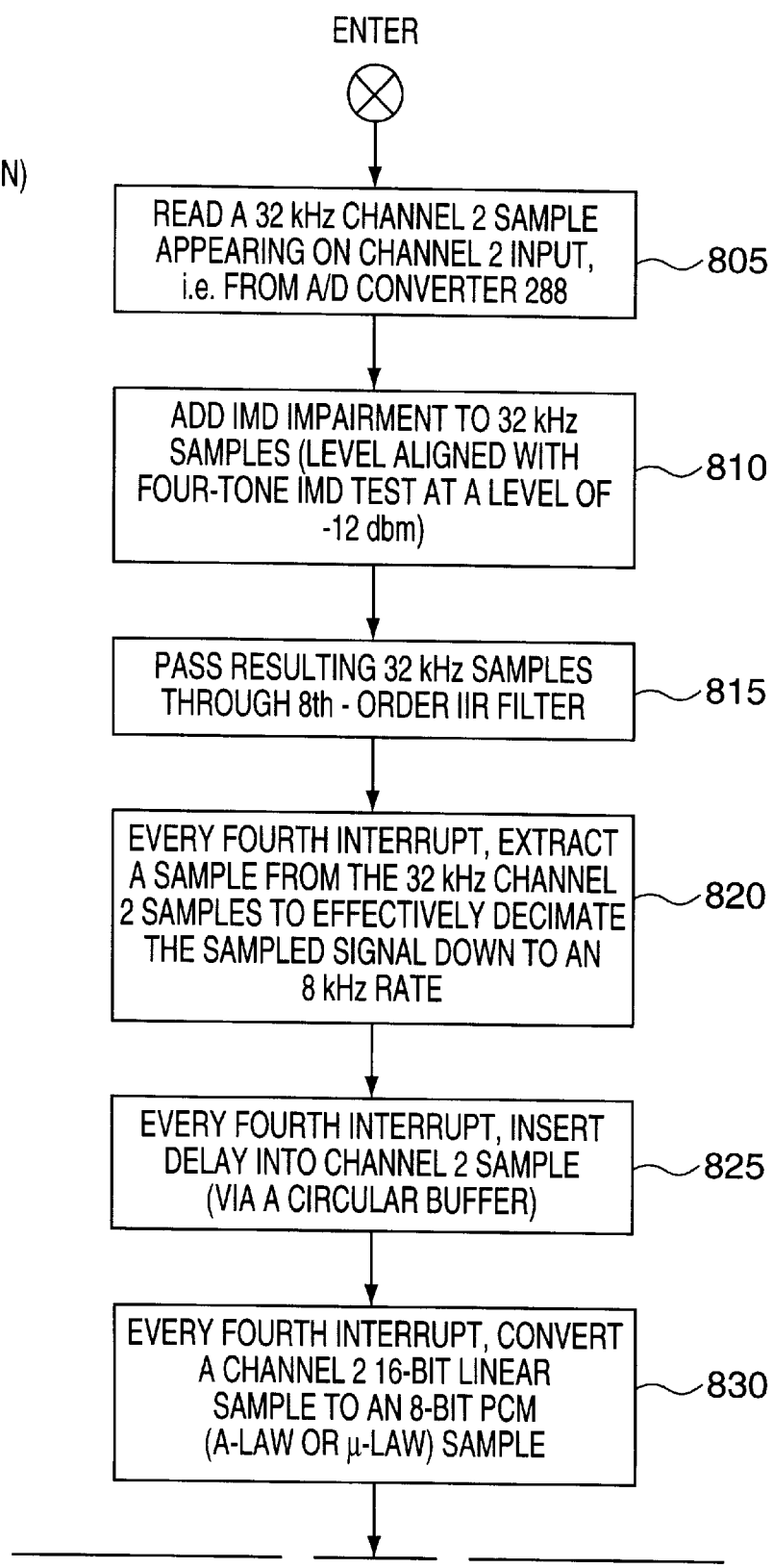
FIGS. 8A and 8B collectively depict a flowchart of Channel 2 (Transmit direction) Process 800 that is executed within Interrupt Service routine 600 shown in FIG. 6.
Figure 8B:
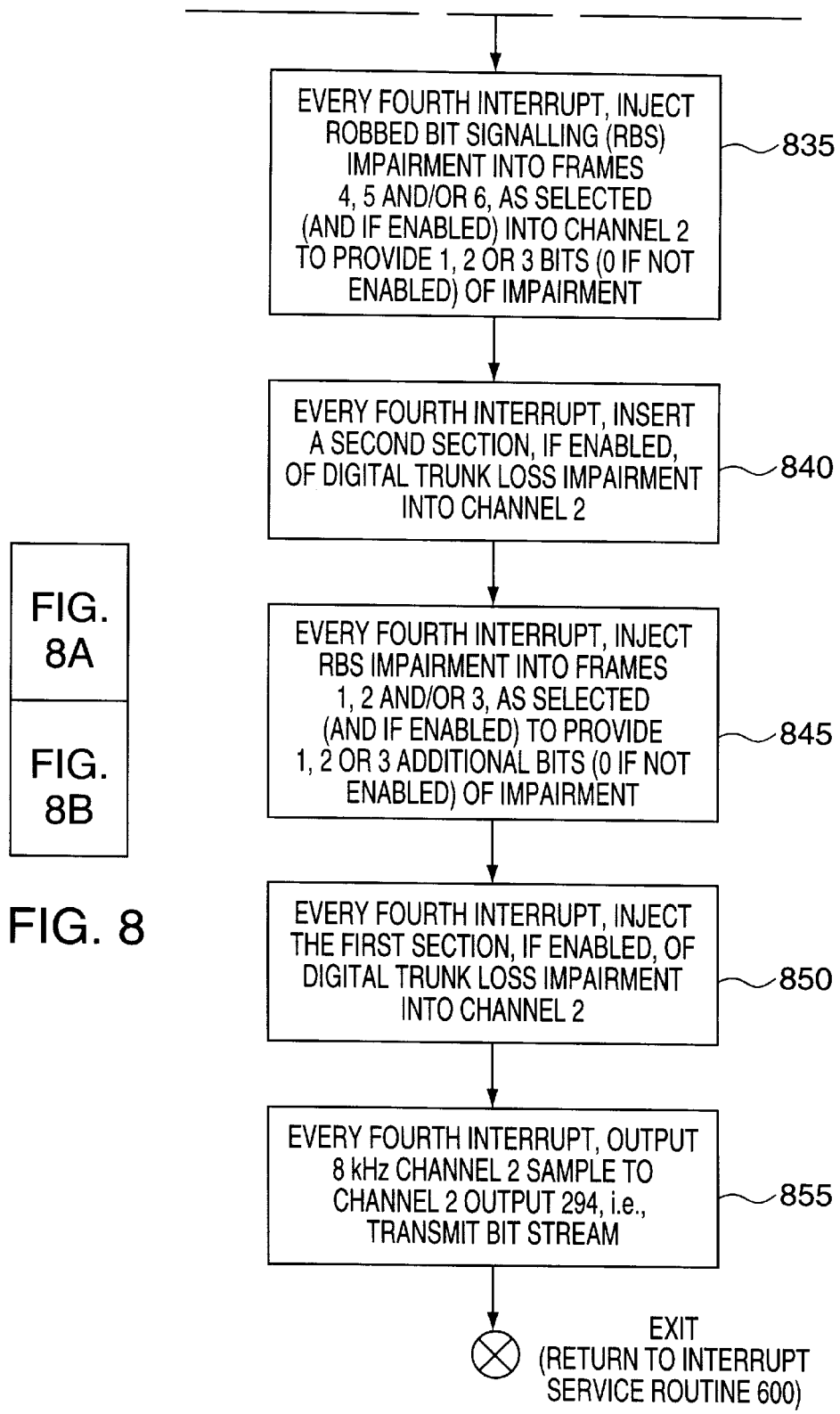

FIGS. 8A and 8B collectively depict a flowchart of Channel 2 (Transmit direction) Process 800 that is executed within Interrupt Service routine 600; the correct alignment of the drawing sheets for these figures is shown in FIG. 8.

Upon entry into this process, execution first proceeds to block 805. This block reads an incoming 16-bit serial linear sample occurring at a 32 kHz sample rate provided by A/D converter 288. Thereafter, block 810 is executed. This particular block, as discussed above in conjunction with block 400, imparts a user-specified level of IMD to that 32 kHz sample. Once this occurs, the resulting impaired sample produced by block 810 is processed through block 815. This block implements, as discussed above in conjunction with block 363, a digital transmit filter. This filter, implemented digitally as illustratively an $8^{th}$-order IIR filter with a lattice structure, removes power occurring at a frequency above 4 kHz from the sample in order to avoid aliasing that would otherwise arise during a subsequent decimation process. This filter also imparts appropriate band shaping required to match a frequency response characteristic of a desired CODEC transmit filter. Thereafter, block 820, as discussed above in connection with block 367, executes to decimate, i.e., down-sample, the 32 kHz samples to 8 kHz. To do so, this block extracts a sample as output, once every four successive 32 kHz interrupts, from the 32 kHz samples in order to produce a 16-bit linear sample at an 8 kHz sample rate, i.e., once every four successive 32 kHz interrupts. Execution then proceeds to block 825 which delays the 8 kHz linear sample. This delay, implemented through another circular buffer (as is delay 735 discussed above in conjunction with FIGS. 7A and 7B) imparts a user-defined amount of network delay to that linear sample. Execution then proceeds to block 830 which converts the linear 16-bit 8 kHz sample into an 8-bit PCM sample (either with A-law or µ-law companding, as selected by the user) occurring at an 8 kHz sample rate. Next, execution proceeds to block 835 which, every fourth 32 kHz interrupt, injects an RBS impairment (as discussed above in conjunction with block 383) into fourth, fifth and/or sixth frames in every six-frame series to provide one, two or three bits of RBS impairment (or no such bits, if this impairment has not been enabled by the user). Thereafter, execution proceeds to block 840 which, also every fourth 32 kHz interrupt, injects a second section, if enabled by the user, of digital trunk loss impairment (as discussed above in conjunction with block 387) into the 8 kHz PCM sample produced by block 835. Once this occurs, execution proceeds to block 845 which, also at every fourth 32 kHz interrupt for an 8 kHz sample rate, injects an RBS impairment (as discussed above in conjunction with block $380_2$) into the first, second and/or third frames in every six-frame series to provide an additional one, two or three bits of RBS impairment (or no such bits, if this impairment has not been enabled by the user). Once this RBS impairment has been fully injected (or not at all as the case may be), then execution proceeds to block 850. This block, also every fourth 32 kHz interrupt, injects a first section, if enabled by the user, of digital trunk loss impairment (as discussed above in conjunction with block $380_2$) into the 8 kHz PCM sample produced by block 845. Thereafter, through execution of block 855, a resulting impaired PCM sample occurring at an 8 kHz sample rate produced by block 850 is applied by the DSP, as a Channel 2 output sample and routed to switched digital transmit interface 210. Once this occurs, execution exits from process 700 and returns to Interrupt Service routine 600.

Though we have implemented various portions of the signal processing digitally through a digital signal processor, those skilled in the art clearly realize that this processing could alternatively be implemented in a general purpose programmed microcomputer or even with discrete digital and/or analog circuitry.

Although a single embodiment which incorporates the teachings of the present invention has been shown and described in detail herein, those skilled in the art can readily devise many other embodiments that still utilize these teachings.

We claim:

1. Apparatus for simulating a public switched telephone network connection, wherein the network connection is subject to a plurality of impairments, the impairments comprising network and line card impairments; the network impairments comprising any one of a group consisting of robbed bit signaling (RBS), digital trunk loss and network delay; and the line card impairments comprising any one of a group consisting of intermodulation distortion (IMD), echo and analog loss; the apparatus comprising:

a digital port for connection to a digital station and for carrying digital communication over a telephone communications channel, between the digital station and an emulator, at a first sampling rate associated with the channel;

an analog port for connection to an analog station; and the emulator, connected to said digital and analog ports, for providing a communication path between said digital and analog stations that simulates the network connection and for selectively impairing the path by at least one of the impairments, wherein the emulator implements at least one of the network impairments at the first sampling rate and implements the IMD at a second sampling rate that exceeds the first sampling rate.

2. The apparatus in claim 1 wherein the echo and analog loss are each implemented in an analog domain.

3. The apparatus in claim 2 further comprising:

a digital processing system, connected to said digital port, for implementing said network impairments and said IMD; and analog circuitry, connected to said digital processing system and said analog port, for communicating impaired data with said digital processing system and for implementing the echo and the analog loss.

4. The apparatus in claim 3 wherein the digital processing system comprises:

a processor; and a memory for storing computer instructions for execution by the processor.

5. The apparatus in claim 4 wherein the processor, in response to the stored instructions:

(a) receives a first stream of incoming digital samples appearing at the digital port and originating from the digital station and occurring at the first sampling rate;

(b) imparts said RBS and digital trunk loss to the first stream of incoming digital samples so as to form first partially impaired digital samples;

(c) imparts a predefined amount of digital delay to the first partially impaired digital samples so as to yield first delayed digital samples, the predefined amount of digital delay representing the network delay; and (d) imparts a predefined amount of said IMD to the first delayed digital samples so as to yield a first stream of impaired digital samples.

6. The apparatus in claim 5 wherein the processor, in response to the stored instructions, performs operation (d) at the second sampling rate and each of operations (a)–(c) at the first sampling rate.

7. The apparatus in claim 6 wherein the first and second sampling rates are 8 and 32 kHz, respectively.

8. The apparatus in claim 6 wherein the digital signal processing system is implemented through a digital signal processor (DSP) circuit.

9. The apparatus in claim 6 wherein the processor, in response to the stored instructions interpolates each of said first delayed digital samples from the first sampling rate to the second sampling rate prior to imparting the predefined amount of the IMD thereto.

10. The apparatus in claim 6 wherein the analog circuitry comprises:

a digital-to-analog (D/A) converter for converting the first stream of impaired digital samples, produced by the digital processing system, to a first analog signal;

a first analog filter, connected to an output of the D/A converter, for filtering the first analog signal so as to provide a first filtered analog signal;

a first circuit, having a programmable loss element, connected to an output of the first analog filter for imparting a first variable amount of loss to the first filtered analog signal so as to produce a first analog output signal, the first analog output signal being routed as an outgoing analog signal to the analog port and destined to the analog station;

an echo generation circuit, connected to the first circuit and to a summer, for routing a predefined portion of an analog signal produced by the programmable loss element, as an echo signal, to an input of the summer; the echo signal representing an echo impairment;

the summer, responsive to the echo signal and to an analog input signal containing data originating with the analog station, for producing a summed analog input signal;

a second circuit, having a programmable loss element and responsive to the summed analog signal, for imparting a second variable amount of loss to the summed analog input signal so as to produce an analog loss signal; the first and second variable amounts of loss representing first and second analog loss impairments, respectively;

a second analog filter, connected to the second circuit, for filtering the analog loss signal so as to provide an impaired analog signal; and an analog-to-digital (A/D) converter for converting the impaired analog signal to a stream of outgoing digital samples and applying the outgoing stream of digital samples to the digital processing system, wherein the outgoing stream of digital samples contains data originating from the analog station and destined for the digital station.

11. In apparatus for simulating a public switched telephone network connection, wherein the network connection is subject to a plurality of impairments, the impairments comprising network and line card impairments; the network impairments comprising any one of a group consisting of robbed bit signaling (RBS), digital trunk loss and network delay; and the line card impairments comprising any one of a group consisting of intermodulation distortion (IMD), echo and analog loss; the apparatus having a digital port for connection to a digital station and for carrying digital communication over a telephone communications channel, between the digital station and an emulator, at a first sampling rate associated with the channel; an analog port for connection to an analog station; a method comprising the steps of:

providing, through the emulator, connected to said digital and analog ports, a communication path between said digital and analog stations that simulates the network connection;

selectively impairing the path by at least one of the impairments; and implementing at least one of the network impairments at a first sampling rate and the IMD at a second sampling rate that exceeds the first sampling rate.

12. The method in claim 11 wherein the echo and analog loss are each implemented in an analog domain.

13. The method in claim 12 further comprising the steps of:

implementing said network impairments and said IMD through a digital processing system, connected to said digital port; and implementing the echo and the analog loss through analog circuitry, connected to said digital processing system and said analog port, which communicates impaired data with said digital processing system.

14. The method in claim 13 further comprising the steps of:

accepting incoming digital samples at the first sampling rate, appearing at the digital port, containing data emanating from the digital station and destined for the analog station;

digitally impairing the incoming digital samples first by the network impairments followed by the IMD to yield impaired digital samples;

converting the impaired digital samples to an analog signal;

impairing the analog signal by a remainder of line card impairments to form an impaired analog signal; and routing the impaired analog signal, via said analog port, to the analog station.

15. The method in claim 13 further comprising the steps of:

accepting an incoming analog signal containing data originating from the analog station and destined for the digital station;

impairing the analog signal by the ECHO and analog loss so as to form an impaired analog signal;

converting the impaired analog signal to digital form so as to yield partially impaired digital samples;

digitally impairing the partially impaired digital samples by the IMD followed by the network impairments to yield outgoing impaired digital samples; and routing the outgoing impaired digital samples, via the digital port, to the digital station.

16. The method in claim 13 further comprising the steps of, in the digital processing system:

(a) receiving a first stream of incoming digital samples appearing at the digital port and originating from the digital station and occurring at the first sampling rate;

(b) imparting said RBS and digital trunk loss to the first stream of incoming digital samples so as to form first partially impaired digital samples;

(c) imparting a predefined amount of digital delay to the first partially impaired digital samples so as to yield first delayed digital samples, the predefined amount of digital delay representing the network delay; and (d) imparting a predefined amount of said IMD to the first delayed digital samples so as to yield a first stream of impaired digital samples.

17. The method in claim 16 further comprising the steps of, performing step (d) at the second sampling rate and each of steps (a)–(c) at the first sampling rate.

18. The method in claim 17 wherein the first and second sampling rates are 8 and 32 kHz, respectively.

19. The method in claim 17 further comprising the step of interpolating each of said first delayed digital samples from the first sampling rate to the second sampling rate prior to imparting the predefined amount of the IMD thereto.

20. The method in claim 17 further comprising, in the analog circuitry:

converting, through a digital-to-analog (D/A) converter, the first stream of impaired digital samples, produced by the digital processing system, to a first analog signal;

filtering, through a first analog filter connected to an output of the D/A converter, the first analog signal so as to provide a first filtered analog signal;

imparting through a first circuit having a programmable loss element connected to an output of the first analog filter, a first variable amount of loss to the first filtered analog signal so as to produce a first analog output signal, the first analog output signal being routed as an outgoing analog signal to the analog port and destined to the analog station;

routing a predefined portion of an analog signal produced by the programmable loss element, as an echo signal, to an input of a summer; the echo signal representing an echo impairment;

producing through a summer, responsive to the echo signal and to an analog input signal containing data originating with the analog station, a summed analog input signal;

imparting, through a second circuit having a programmable loss element and responsive to the summed analog signal, a second variable amount of loss to the summed analog input signal so as to produce an analog loss signal; the first and second variable amounts of loss representing first and second analog loss impairments, respectively;

filtering through a second analog filter, connected to the second circuit, the analog loss signal so as to provide an impaired analog signal;

converting, through an analog-to-digital (A/D) converter, the impaired analog signal to a stream of outgoing digital samples; and applying the outgoing stream of digital samples to the digital processing system, wherein the outgoing stream of digital samples contains data originating from the analog station and destined for the digital station.

* * * * *